US012639952B2

(12) United States Patent
Idowu et al.

(10) Patent No.: US 12,639,952 B2
(45) Date of Patent: May 26, 2026

(54) EGRESS OBSTRUCTION DETECTION VIA COMPUTER VISION

(71) Applicant: Morgan State University, Baltimore, MD (US)

(72) Inventors: Ismail A. Idowu, Catonsville, MD (US); Kofi Nyarko, Essex, MD (US)

(73) Assignee: Morgan State University, Baltimore, MD (US)

( * ) Notice: Subject to any disclaimer, the term of this patent is extended or adjusted under 35 U.S.C. 154(b) by 266 days.

(21) Appl. No.: 18/672,821

(22) Filed: May 23, 2024

(65) Prior Publication Data

US 2024/0395047 A1 Nov. 28, 2024

Related U.S. Application Data

(60) Provisional application No. 63/468,422, filed on May 23, 2023.

(51) Int. Cl.
*G06V 20/52* (2022.01)
*G06V 10/32* (2022.01)
*G06V 10/75* (2022.01)

(52) U.S. Cl.
CPC .............. *G06V 20/52* (2022.01); *G06V 10/32* (2022.01); *G06V 10/751* (2022.01)

(58) Field of Classification Search
CPC ....... G06V 20/52; G06V 10/32; G06V 10/751
See application file for complete search history.

(56) References Cited

U.S. PATENT DOCUMENTS

| 2016/0253790 | A1* | 9/2016 | Putraya | .................... | G06T 5/73 |
| | | | | | 382/167 |
| 2018/0068431 | A1* | 3/2018 | Takeda | ....................... | G06T 7/74 |
| 2018/0157929 | A1* | 6/2018 | Qi | ........................... | G06T 7/174 |
| 2026/0089551 | A1* | 3/2026 | Liu | ................... | H04W 28/0278 |

* cited by examiner

*Primary Examiner* — Dave Czekaj

(74) *Attorney, Agent, or Firm* — Whiteford, Taylor & Preston, LLP; Peter J. Davis

(57) ABSTRACT

An Automated Computer-Vision based system and method for identifying potential hazards to building occupants in building exit pathways is described to address the inherent challenges in manual building safety inspections. The computer vision-based approach automates the inspection of an interior building hallway (exit access) for an obstruction that may be a potential hazard. The invention mitigates the risk of a hazard to the building occupants by sensing and alerting the safety officer before a situation turns into an emergency. Test results demonstrate that the Dual Temporal Buffer Differencing (DTBD) method of the invention can detect a potential hazard in the building exit access effectively and continuously. As a result, the invention can facilitate safety in the building and allow safety inspectors to make better use of resources.

9 Claims, 3 Drawing Sheets

EGRESS OBSTRUCTION DETECTION VIA COMPUTER VISION

FIELD OF THE INVENTION

The present invention relates to automated methods for identifying obstacles in building exit pathways and for determining when such obstacles have been removed.

BACKGROUND OF THE INVENTION

The safety of life and properties is a high priority of businesses and government agencies, which leads to mandatory safety inspections in all properties. The Occupational Safety and Health Act of 1970 (OSH Act) which was created to encourage safer workplace conditions, highlights the importance of safety inspections to identify and help to eliminate workplace hazards. According to the National Fire Protection Association ("NFPA"), inspection of means of egress is a critical part of facility safety inspections. The NFPA defines means of egress as a continuous and unobstructed path of travel from any point in a building or structure to a public way that consists of the following three separate and distinct parts: exit, exit access, and exit discharge. Exit access is the travel path from where a person is located to the entrance of an exit—for example, hallway, and stairs. According to the NFPA, a building owner or agent shall inspect the means of egress to ensure it is maintained free of obstruction and correct any deficiency. Therefore, safety inspections and monitoring must be conducted based on this code to minimize potential fire hazards to the occupants. The typical way to conduct safety inspections is an on-site walk-through audit to identify potential hazards to occupants and personnel, monitor occupational safety, and ensure that remedial actions are taken to address any issues. However, such manual safety compliance checks can be labor-intensive, time-consuming, and inconsistent. As a result, safety compliance is difficult to assure and thus remains a significant concern for employers.

U.S. Pat. No. 9,928,708 refers to surveillance of video for security purposes and may use motion boxes to define an object of interest. U.S. Pat. No. 8,830,331 describes how digital image processing is used to create histograms identifying characteristics of the video signal, including motion and color.

SUMMARY OF THE INVENTION

To address these challenges, a Dual Temporal Buffer Differencing ("DTBD") computer vision-based invention is presented here that automates the inspection of an interior building hallway (exit access) for obstructions and flag them as potential safety issues. This invention mitigates the risk of a potential egress blockage to a building's occupants by sensing and alerting the safety officer before a situation turns into an emergency. DTBD applies background subtraction techniques to detect an obstruction in the exit access. In addition, through continuous re-detection, the invention can determine an absence of the obstruction and update the safety inspector that the egress path is clear. Notwithstanding the challenges of determining the absence of an obstruction, the invention performs well in detecting the absence of obstruction, with an accuracy of 90%.

The performance of the invention and its benefits were evaluated through a case study. The results demonstrated that the Dual Temporal Buffer Differencing (DTBD) system of the invention can detect a potential obstruction in the building exit access effectively and continuously.

BRIEF DESCRIPTION OF DRAWINGS

The foregoing summary, as well as the following detailed description of an exemplary embodiment of the invention, will be better understood when read in conjunction with the appended drawings. For the purposes of illustrating the invention, there are shown in the drawings embodiments which are presently preferred. It should be understood, however, that the invention is not limited to the precise arrangements and instrumentalities shown in the drawings.

DETAILED DESCRIPTION OF THE INVENTION

Figure 1:
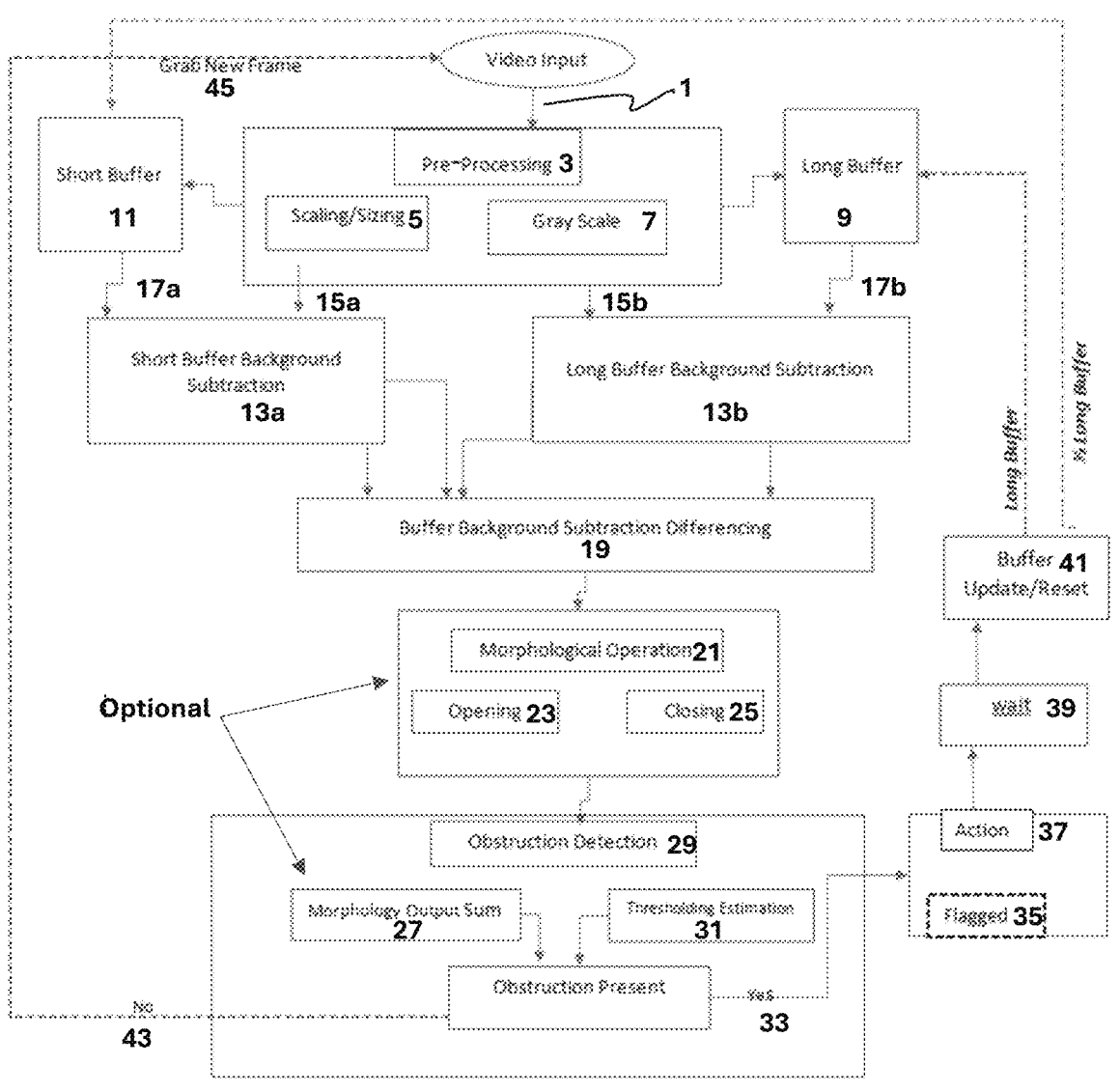
FIG. 1 is a flowchart showing various features according to an embodiment of the invention.

The invention is a novel computer vision-based means of egress obstruction detection based on a DTBD method. The equipment required is nominal, and the required camera feed may be obtained from an existing surveillance camera. An exemplary embodiment of the invention is shown in FIG. 1. In a first step 1, a stream of image frames is extracted from an input camera. The camera input may be video or stills, provided it supplies a relatively continuous stream of video or frames. If processing resources are limited, each frame of the input may be pre-processed 3 to resize 5 and/or convert color images to grayscale 7. The sequential image frames are sent to two sliding temporal buffers, a long buffer (LB) 9 and a short buffer (SB) 11 on a first-in-first-out basis. Through digital averaging, the buffers model the background scene at differing temporal resolutions. The lengths of the long buffer and the short buffer should both be selected to be long enough to account for changes in lighting, transient activity, etc., but not so long that the presence of a temporary obstacle in the field of view "disappears" as a result of the background modeling process. The long buffer should be sufficiently longer than the short buffer so that when an obstacle is introduced into the field of view, it becomes part of the background image in the short buffer, but not in the long buffer.

Next, a background subtraction method 13a, 13b between the incoming frame and each buffer is introduced to mask the foreground of the two buffers. This step calculates, for each of the long and short buffers, the pixel difference between the current frame 15a, 15b and the background frame (the average of all frames in the buffer) 17a, 17b. If the mask is blank (no difference between the current frame and the buffer average, e.g., FIG. 3), there is no persistent activity/phenomenon in the camera's field of view. If the mask is non-blank, the mask image will show where in the current frame the persistence activity/phenomenon resides, e.g., FIG. 4. This holds true for both the short buffer and the long buffer, and it takes place for both buffers simultaneously. The short buffer mask is then compared to the long buffer mask in a buffer background subtraction differencing step 19, and the absolute difference between the two buffer masks (pixels present in the short buffer that are not present in the long buffer) represents a potential obstacle in the field of view, e.g., FIG. 5.

Before arriving at a final determination that an obstruction is present based on the differencing operation, however, morphological operations 21 may optionally be run to remove features within the foreground caused by camera noise and other anomalies inherent in the system to avoid spurious conclusions as to the presence of an obstruction. The morphological operations used for this purpose may include "opening" 23 and "closing" 25 operations, where an opening operation removes small anomalies from an image (replacing white pixels with black pixels) while preserving the shape and size of larger objects in the image and where a closing operation removes small holes in the foreground mask by filling it up. The result of this optional morphological processing is referred to in FIG. 1 as the Morphology Output Sum 27.

The difference between long buffer mask and short buffer mask, with or without optional morphological operation, is compared in step 29 with a predetermined threshold constant to determine whether the phenomenon represented by the difference in buffer masks meets the detection threshold for an obstruction 31. The detection threshold constant may be set, for example, so that phenomenon below a certain size, and/or in a certain part of the field of view, are not characterized as "an obstruction." If the threshold is not met, the same process described above continues on a frame-by-frame basis without interruption until the detection threshold is met.

If the threshold is met 33, the presence of an exit obstruction is determined to exist or "flagged" 35 and an alert may be automatically sent to safety or security personnel for attention 37. In addition, when the detection threshold has been met, the system shifts to detection of removal of the obstruction. In this case, the frame-to-buffer and LB to SB subtractions continue to take place, but updates to both buffers are paused 39 until a significant difference is once again observed between the buffers, indicating the removal of the obstruction. Once the system has determined that the obstruction has been removed, the contents of the LB are restored 41 to a snapshot before the detection of the obstruction, and the SB is set to a subset of the LB, for example ½ the LB, so that repeating the differencing operation will result in no significant observable differences until another obstruction is detected.

If the threshold is not met 43, the process continues to the next frame in the image feed 45.

According to a preferred embodiment, practice of the invention includes a short commissioning stage where the egress pathway, e.g. an exit hallway, is free of obstruction, ensuring that the baseline for the differencing process.

According to an exemplary embodiment, the process may be mathematically represented as follows:

Buffer Set-Up

To establish buffer length, we begin with the time required to capture the data used.

$$T_{stream} = T_{sec} \tag{1}$$

Frame/second is a default standard measure of images captured in one second. In this case, it is constant:

$$F_{PS} = \text{constant}(k) \tag{2}$$

Therefore, the total number of frames in video input ($F_{Total}$) is given as $$F_{Total} = T_{sec} * k \tag{3}$$

Motion time (mt), is the assumed maximum time of transient movement in the video stream.

Motion frame (mf) is the number of video frame capture during the transient motion, Mathematically stated as:

$$mf = mt * k \tag{4}$$

Hence, the length of the LB, x, is preferably set to be product of mt and Z, where z is a function of the size of the motion frame.

Thus:

$$x = mf * z \tag{5}$$

Also, the length of SB, y, is preferably set to be half of the length of long buffer:

$$y = x/2 \tag{6}$$

Buffer Update Analysis

To make sure that the background model is constantly updating, the sliding method may be used, by dropping one frame at a time and adding another frame in sequence using a First-In-First-Out (FIFO) buffer. This concept is explained in equations 6 and 7.

$$\text{Let First frame intake in time index} = Ft, \tag{6a}$$

$$\text{Subsequent intake frames in time index} = \tag{6b}$$
$$Ft+1, Ft+2, Ft+3, Ft+4 .... Ft+n$$

At every frame acquisition, one new frame is added to the buffer, and the oldest frame is removed. Therefore:

$$\text{Initial Frame buffer} = Ft, Ft + 1, Ft + 2, Ft + 3, Ft + 4, \ldots Ft + n \quad (7a)$$

$$\text{Subsequent frame buffer} = Ft + 1, Ft + 2, Ft + 3, Ft + 4, \ldots Ft + n + 1 \quad (7b)$$

Subsequently, the update is done by the averaging of the frames by the length of buffer.

$$\text{Average} = \frac{\text{Sum of pixel intensity in the Buffer}}{\text{Length of Buffer}} = \varepsilon[(x + F_{t+n}) - F_n]/x \quad (8)$$

The foreground mask is achieved by subtracting the present frame from the previous frame. Therefore, considering equation 6a and 6b:

Foreground Mask ($f_{gm}$)

$$f_{gm} = f_t - f_{t+1} \quad (9)$$

Morphology Operation

Morphology may optionally be applied after the output is binarized by thresholding. Let E be an Euclidean space or an integer grid, and A be a binary image in E.

The erosion of the binary image A by the structuring element B is defined by $$A \ominus B = \{z \in E | B_z \subseteq A\}, \quad (10)$$

The erosion A by B is also can be given by the equation $$B_z = \{b + z | b \in B\}, \forall_z \in E, \quad (11)$$

where $B_z$ is the translation of B by the vector z.

The dilation of A by the structuring element B is defined by $$A \oplus B = \bigcup_{b \in B} A_b \quad (12)$$

The dilation of the binary image A by the structuring element B is defined by $$A \oplus B = \{z \in E | (B^s)_z \cap A \neq \emptyset\}, \quad (12)$$

where $B^s$ denotes the symmetric of B, that is, $$B^s = x\{x \in E | -x \in B\}, \quad (13)$$

The opening of A by B is therefore obtained by the erosion of A by B and followed by dilation of the resulting image of B:

$$A \circ B = (A \ominus B) \oplus B. \quad (14)$$

The closing of A by B is obtained by the dilation of A by B, followed by erosion of the resulting structure by B:

$$A \bullet B = (A \oplus B) \ominus B. \quad (15)$$

Example 1

For experimental verification, an administrative building on a university campus was selected as a data collection site. The experiments were conducted with four different scenarios, where an object capable of being an obstruction is placed in the means of egress (exit access) for some time (t).

An object is considered an obstacle if it remains in the scene for more than four minutes, which is detected when the length of time the static object is visible is greater than the length of the short buffer.

The hardware used for the experiment was a 12-megapixel wide-angle sensor, 12-megapixel telephoto lens, and a 16-megapixel ultra-wide-angle sensor integrated camera.

Since the object was to detect an obstruction in the egress, data from four different scenarios was generated to evaluate the algorithm. The average stream data was 1 hour 40 minutes with different transient motion times. In this context, the transient motion time was the estimated time required for people to work through the hallway without the algorithm flagging their presence as an obstruction.

Data Collection and Formulation Analysis

From equation (2), $$F_{PS} = F_{/s} = \text{constant}(k)$$

where frame per second (F/s) is the default number of frame generated in a second by the camera sensor, k denotes a constant which is equal to 30, $$F_{/s} = 30 \text{ Frames} \quad (16)$$

Given, 1 hour, 40 minutes @ 30 fps $$T_{stream} = (60 + 40) * 600_{sec} = 6000 \quad (17)$$

Where Time of streaming ($T_{stream}$) is the average time required for data collection. The total number of streaming frames ($F_{Total}$) is given as:

$$F_{Total} = T_{stream} * k \quad (18)$$

$$F_{Total} = 6000 * 30 = 180,000 \text{ frames}$$

Buffer Analysis

Given the time of streaming, the motion effect, or the transient motion time (mt), is estimated to be 60 sec. A transient motion time is the estimated time required for a person to work through the hallway without the algorithm flagging her as an obstruction.

Therefore the number of frames during the motion ($M_{frame}$) is given as:

$$M_{frame} = m_t * k \qquad (19)$$

$$M_{frame} = 60 * 30 = 1800_{frames}$$

The estimated buffer lengths were chosen and set so that reasonable exit access traffic was not flagged as an obstruction.

Since Motion frame=1800, from equation (3), the LB length is the number of frames stored in the LB, X, and is determined by:

$$X = M_{frame} * \text{constant}(z) \qquad (20)$$

where z is the estimated constant of the buffer $$X = 1800 * 9 = 16200_{frames}$$

From equation (4), the SB is the length of frames stored by SB, Y, and was half of the LB for this example.

$$\text{i.e., } Y = x/2 \qquad (21)$$

$$Y = \frac{16200}{2} = 8100_{frames}$$

It is important to note that the length of LB was set based on the assumption that transient activity would not exist beyond 1,800 frames.

The length of the SB (half of the LB) for the experiment was selected based on the assumption that it would be sufficient/appropriate to permit quick characterization of any absolute difference between the two buffers as an obstacle. The appropriate buffer lengths can optionally be obtained through the integration of machine learning optimization strategies The difference between the length of time of the LB and the SB can be adapted/tuned based on the desired length of time an obstacle must remain in the field of view to be considered an obstruction.

Figure 2A:
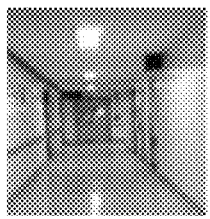
FIG. 2a shows an obstacle-free hallway used to build the background model.
Figure 2B:
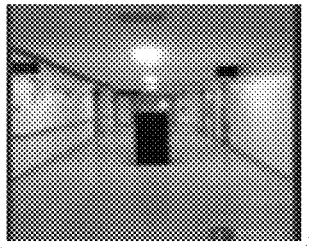
FIG. 2b shows a scene where an obstacle has been placed in the hallway.

FIGS. 2a and 2b show the experimental environment setup of the experiment. FIG. 2a shows an obstacle-free hallway used to build the background model, i.e., fill both LB and SB with obstacle free images. FIG. 2b shows a scene where an obstacle has been placed in the hallway.

Algorithm Performance and Evaluation

Figure 3:
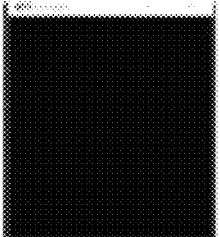
FIG. 3 shows what the LB and SB masks look like when there is no obstruction in the field of view.

FIG. 3 shows what the LB and SB masks look like when there is no obstruction in the field of view (FIG. 2a). Since there is no difference between the LB and the SB masks, the system will determine that there is no obstruction.

Figure 4:
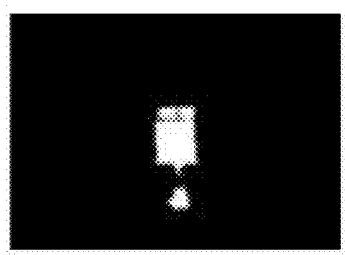
FIG. 4 shows what the LB mask and SB mask both look like upon the initial appearance of an obstacle in the image frame.
Figure 5:
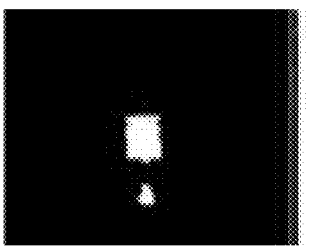
FIG. 5 shows an evolving/diminishing SB mask after a number of image frames containing the obstruction have been integrated into the SB, reducing the differences between the incoming frame and the digital average of the SB.
Figure 6:
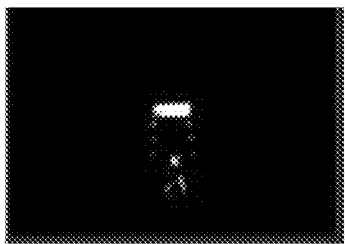
FIG. 6 shows the difference between the SB mask of FIG. 5 and a contemporaneous LB mask.

When an obstruction is introduced into the field of view (FIG. 2b), the initial LB and SB masks will look identically non-blank, FIG. 4 (both subtracting a frame including the obstruction from a background containing no obstruction), but due to the temporal difference between the SB and the LB, the frames including the obstruction will quickly become a significant contributor to the SB background, and the SB mask (the difference between the current frame and the SB) will diminish, FIG. 5. But the potential obstruction will take much longer to become integrated into the LB background, so changes to the LB and hence the LB mask (the difference between the current frame and the LB background) occur much more slowly. As time progresses, the differences between the LB mask (still looking largely like FIG. 4) and the quickly diminishing SB mask (e.g., FIG. 5) will increase until the differencing operation between the LB mask and the SB mask produces a significant mass of foreground pixels, FIG. 6, indicating that an obstruction may be present.

Following optional morphological processing to remove camera noise, the mass of the pixels in the difference between the LB mask and the SB mask is compared to a predetermined threshold set to the desired sensitivity of the obstruction-detection method. If the mass of the pixels meets the predetermined threshold, the presence of an obstruction is flagged and electronic alert is sent to a designated party.

An obstacle having been detected, the buffers are paused, the SB reflecting the presence of the obstacle, the LB containing a vestige of the obstacle, due to its length being, in this example, 2× the length of the SB. The new frame-buffer differencing continues, followed by the LB mask/SB mask differencing. As long as the obstacle persists, the SB mask will be blank, and the LB mask will be non-blank. When the obstacle is removed, the SB mask will immediately be non-blank, as will the LB mask, but difference between the SB and LB masks will indicate likely removal of the obstacle.

This invention thus constitutes an effective computer vision-based DTBD approach for monitoring an exit access and detecting obstructions. The invention therefore provides safety inspectors with an automatic mechanism to proactively identify any potential obstruction hazard by monitoring the system and immediately identifying when a potentially dangerous condition exists. In addition, this system can send an alert to the building manager indicating an obstruction has been detected. In this way, the approach can be used by the building management to keep their buildings safe from egress hazards.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure. It is specifically noted that each and every combination and sub-combination of the above-listed and below-described features and embodiments is considered to be part of the invention.

The invention claimed is:

1. A computer-implemented system for detecting the presence or absence of an object in an image capture device's field of view comprising:

a. an image capture device having a field of view and directed at an area of interest, b. a computing device in electronic communication with said image capture device, said computing device comprising a processor and a non-transient memory, c. said non-transient memory containing a long buffer and a short buffer, said long buffer comprising a first evolving digital average of image frames of said area of interest taken during an advancing period of time having length X, said short buffer comprising a second evolving digital average of image frames of said area of interest taken during a trailing subset of said advancing period of time having length X;

d. said non-transient memory further comprising computer readable instructions which when executed by said processor cause said computing device to i. receive sequential image frames of said area of interest from said image capture device;

ii. compare each said sequential image frame of said area of interest with said long buffer and with said short buffer to generate a long buffer foreground mask and a short buffer foreground mask, respectively;

iii. compare each long buffer foreground mask to said short buffer foreground mask;

iv. determine whether any difference between said long buffer mask and said short buffer mask meets a predetermined threshold criteria for presence of an obstacle;

v. when said predetermined threshold criteria for presence of an obstacle is not met, add each said sequential image frame to said long buffer and said short buffer and remove an earlier sequential image frame to said long buffer and said short buffer on a first-in-first-out basis;

repeat steps (d)(i) through (d)(iv);

vi. when said predetermined threshold criteria for presence of an obstacle is met, send an electronic alert to a designated user or user group;

save in said non-transient memory a current state of said long buffer;

reset said long buffer to reflect the presence of said obstacle;

repeat steps (d)(i) through (d)(iii);

determine whether any difference between said long buffer mask and said short buffer mask meets a predetermined threshold for absence of said obstacle;

vii. when said predetermined threshold for absence of said obstacle has not been met, add each said sequential image frame to said reset long buffer and said short buffer and remove an earlier sequential image frame to said long buffer and said short buffer on a first-in-first-out basis;

repeat steps (d)(i) through (d)(iii);

viii. when said predetermined threshold for absence of said obstacle has been met, reset said long buffer and said short buffer to reflect an obstacle-free field of view;

repeat steps (d)(i) through (d)(iv).

2. A computer-implemented system according to claim 1, wherein said computer readable instructions, when executed by said processor, further cause said computing device to pre-process said image frames prior to feeding them to said short buffer and long buffer and before comparing said image frames to said short buffer and said long buffer.

3. A computer-implemented system according to claim 2, wherein said pre-processing comprises rending color images to grayscale.

4. A computer-implemented system according to claim 2, wherein said pre-processing comprises resizing said images.

5. A computer-implemented system according to claim 1, wherein said computer readable instructions, when executed by said processor, further cause said computing device to carry out morphological operations on said any difference between said long buffer mask and said short buffer mask before determining whether said any difference between said long buffer mask and said short buffer mask meets a predetermined threshold criteria for presence of an obstacle.

6. A computer-implemented system according to claim 1, wherein prior to step (d)(i), said long buffer and said short buffer are populated with image frames reflecting an obstacle free field of view.

7. A computer-implemented system according to claim 1, wherein said long buffer comprises a digital average of image frames over a period of time.

8. A computer-implemented system according to claim 1, wherein said long buffer comprises a digital average of image frames over a period of about 1-4 hours.

9. A computer-implemented system according to claim 1, wherein said short buffer comprises a digital average of image frames over a period of time that is 25% to 50% of said long buffer.

\* \* \* \* \*